United States Patent [19]

Miller, Jr. et al.

[11] Patent Number: 5,730,391
[45] Date of Patent: Mar. 24, 1998

[54] UNIVERSAL FLUID-DYNAMIC BODY FOR AIRCRAFT AND WATERCRAFT

[76] Inventors: John A. Miller, Jr., 1778 Potrero Dr., San Jose, Calif. 95124-1752; William A. Losey, deceased, late of Santa Maria, Calif.; by Marion E. Losey, executor, 1600 E. Clark, #107, Santa Maria, Calif. 93455

[21] Appl. No.: 458,868

[22] Filed: Jun. 5, 1995

[51] Int. Cl.$^6$ .............................. B64C 3/54; B64C 1/38; B63B 1/00
[52] U.S. Cl. ............... 244/36; 244/35 A; 244/23 C; 244/218; 244/130; 114/56; D12/300; D12/319; D12/325
[58] Field of Search ............. 244/35 A, 36, 244/218, 130, 23 C, 35 R; 114/271, 56; D12/300, 308, 309, 319, 325, 326

[56] References Cited

U.S. PATENT DOCUMENTS

| D. 172,112 | 5/1954 | Shoemaker | 244/23 C |
|---|---|---|---|
| 514,835 | 2/1894 | Mills | 114/56 |
| 2,650,780 | 9/1953 | Northrop et al. | 244/36 |
| 2,955,776 | 10/1960 | Ziegler | 244/36 |
| 2,995,104 | 8/1961 | Mills | 114/56 |
| 3,008,669 | 11/1961 | Tanczos et al. | 244/15 |
| 3,073,551 | 1/1963 | Bowersox | 244/73 B |
| 3,123,320 | 3/1964 | Slaughter | 244/23 C |
| 3,195,496 | 7/1965 | Skuce, II | 114/271 |
| 3,971,535 | 7/1976 | Jones | 244/46 |
| 4,836,470 | 6/1989 | Criwell | 244/2 |
| 4,955,962 | 9/1990 | Mell | 244/23 C |
| 5,064,143 | 11/1991 | Bucher | 244/23 B |
| 5,112,120 | 5/1992 | Wood | 244/34 R |
| 5,203,521 | 4/1993 | Day | 244/73 B |
| 5,259,571 | 11/1993 | Blazquez | 244/23 C |
| 5,538,201 | 7/1996 | Gerhardt | 244/36 |

FOREIGN PATENT DOCUMENTS

| 2635407 | 2/1978 | Germany | 244/23 C |

OTHER PUBLICATIONS

National Advisory Committee for Aeronautics (NACA), TN 3183, "Minimum Wave Drag Sirfoil Sections for Arrwo Wings" Cooper et al. May 1954, May 1994.
AIAA 92–4220, M. Waters et al., "Structural & Aerodynamic Considerations for Oblique All–Wing Aircraft".
AIAA 92–4230, T. Galloway et al., "Oblique Wing Supersonic Transport" McGraw–Hill, Inc.
Aerospace Daily, p. 448, Jun. 20, 1994, "MTU Hypersonic Nozzle Test Paves Way For Full Engine Test by 1997".
Aerospace Daily, p. 120, 25 Jan. 95, "Ca Company Plans Frisbee–Like VTOL Aircraft".

*Primary Examiner*—Virna Lissi Mojica

[57] ABSTRACT

A body configuration for improving the fluid-dynamic performance efficiency of aircraft and watercraft comprises a generally conical upper segment (54) and a generally conical lower segment (56) that are joined at a common base plane (53), achieved by inverting the conical lower segment (56). The slopes of the conical surfaces are determined by the prescribed planform of the craft or vehicle and by the height of the conical segments wherein the height of the conical upper segment ($h_u$) is less than and typically two-thirds that of the conical lower segment ($h_L$). Although not limited to elliptical planforms, a generally circular planform (52) is preferred for a vertical takeoff and landing aircraft operating in the subsonic flight regime and an elliptical planform (68), with a large aspect ratio for takeoff and low-speed flight, then rotating to a low-aspect-ratio orientation for supersonic flight operation, is preferred for supersonic transport and single-stage-to-orbit type aircraft. The unique conical configuration allows the aircraft to take off and operate at low-speeds with the high lift and efficiency of the large aspect ratio orientation, operate as an oblique all-wing aircraft during climb and acceleration to higher flight speeds, and then fully transition to the low aspect ratio orientation for high-speed operation, including transonic, supersonic, and hypersonic flight. Allowable modifications are defined to optimize and adapt the universal fluid-dynamic body to satisfy unique functional requirements of potential vehicle applications, including submersible and surface-effects type watercraft.

16 Claims, 13 Drawing Sheets

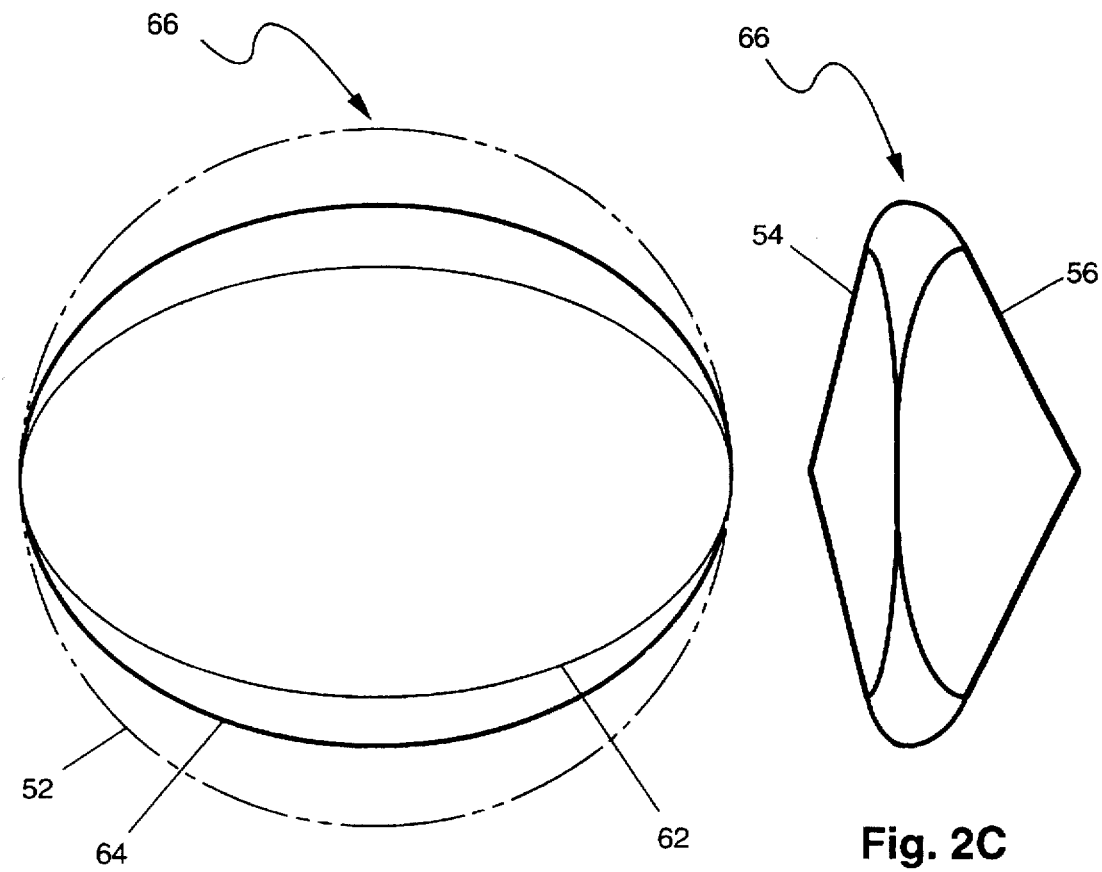
Fig. 2B
Fig. 2C
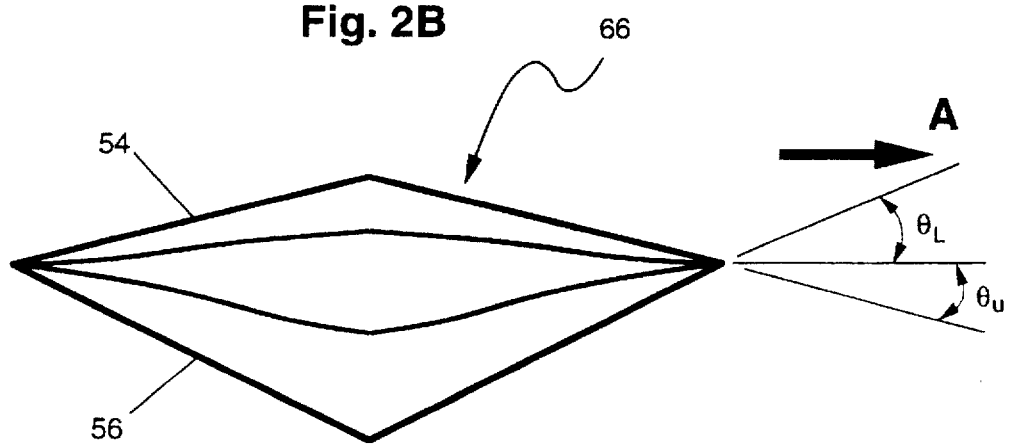
Fig. 2A

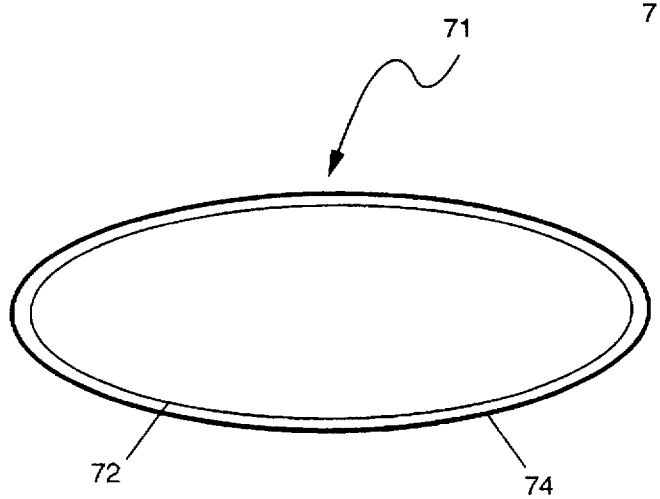
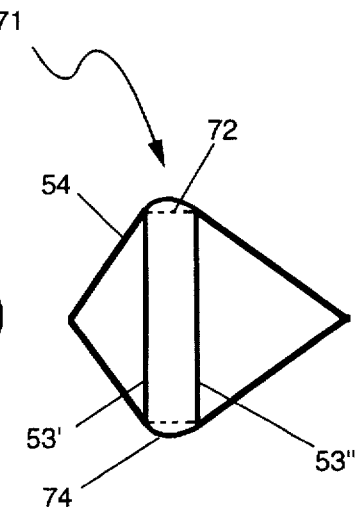
Fig. 4B
Fig. 4C
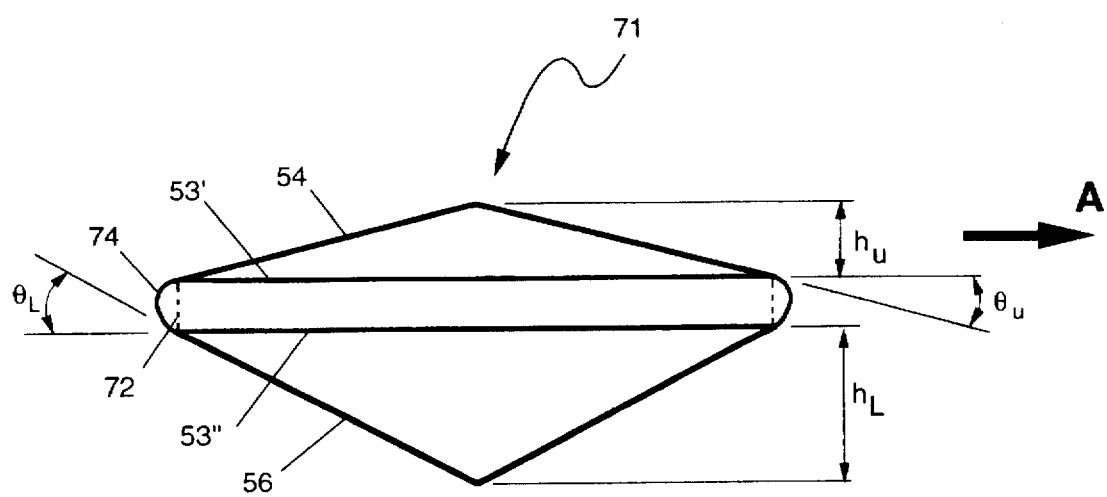
Fig. 4A

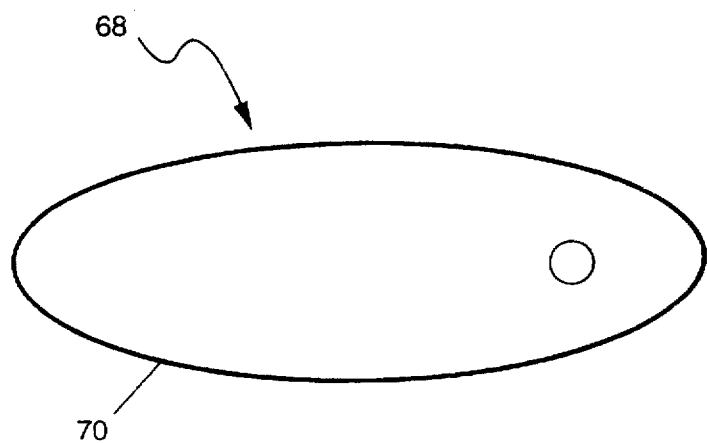
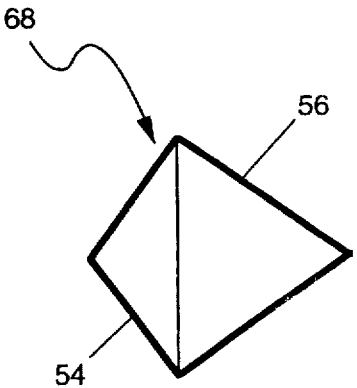
Fig. 5B
Fig. 5C
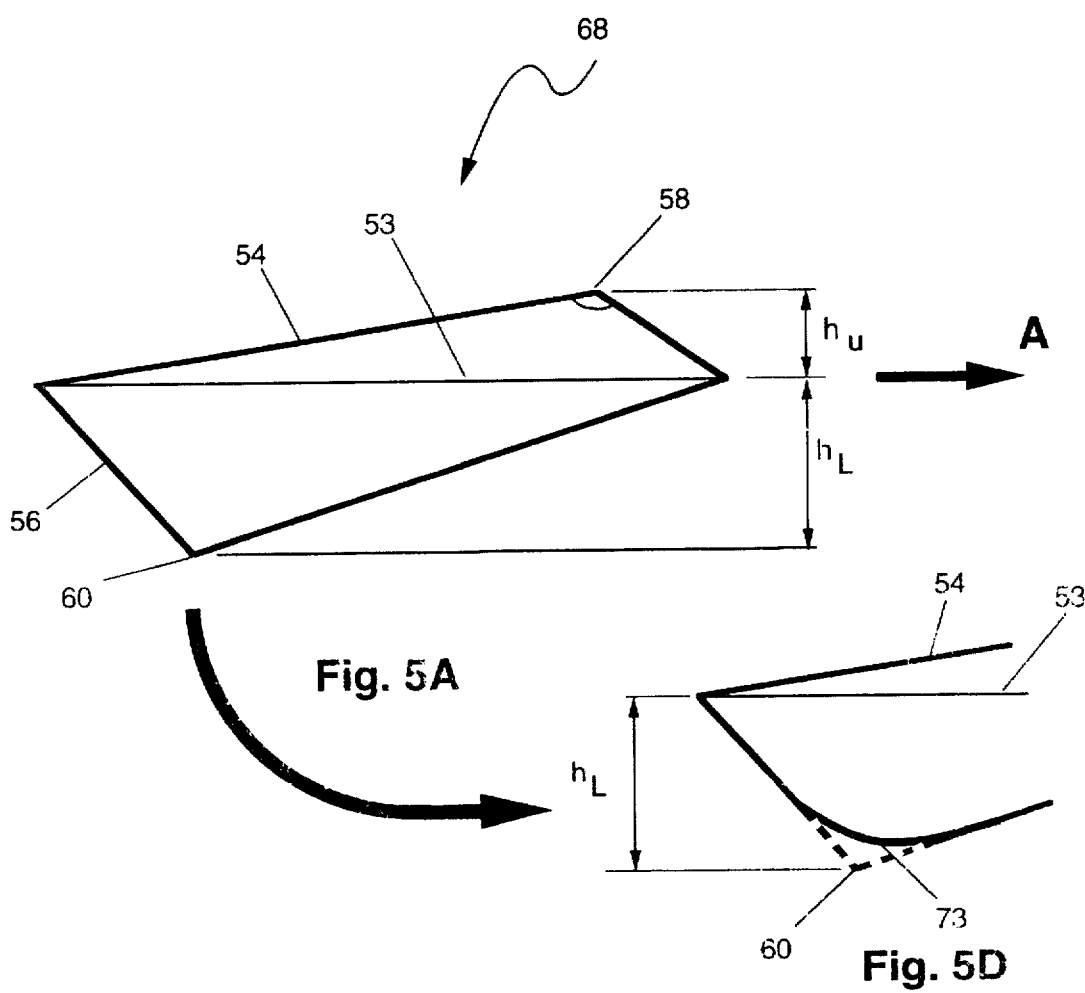
Fig. 5A
Fig. 5D

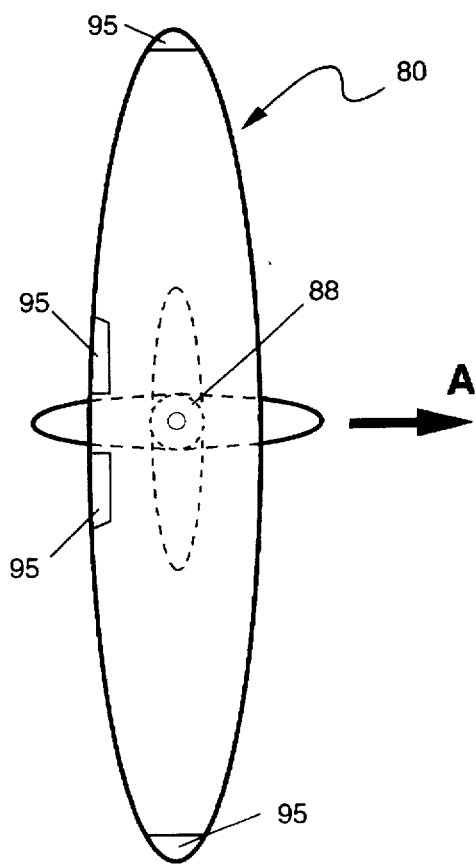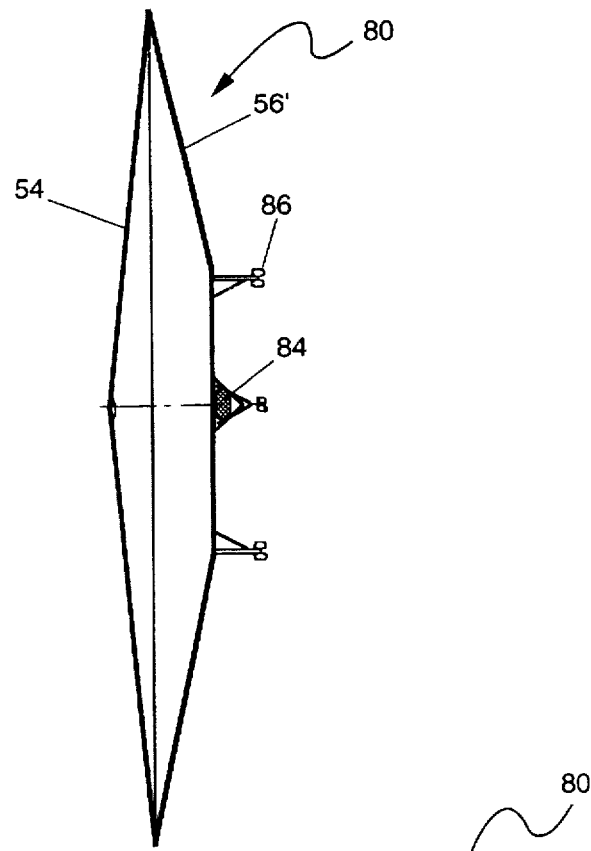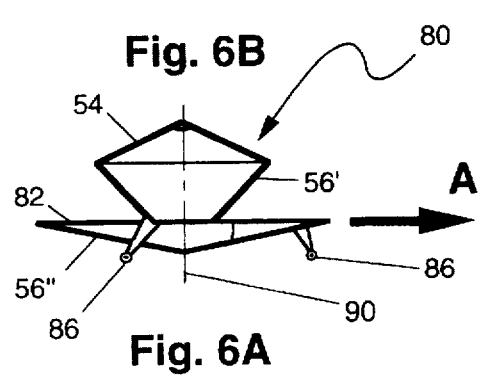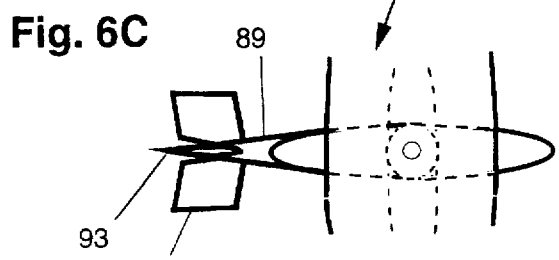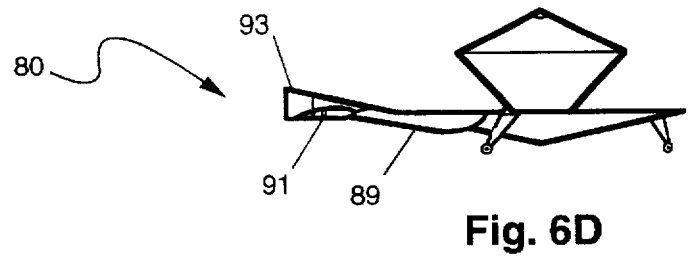

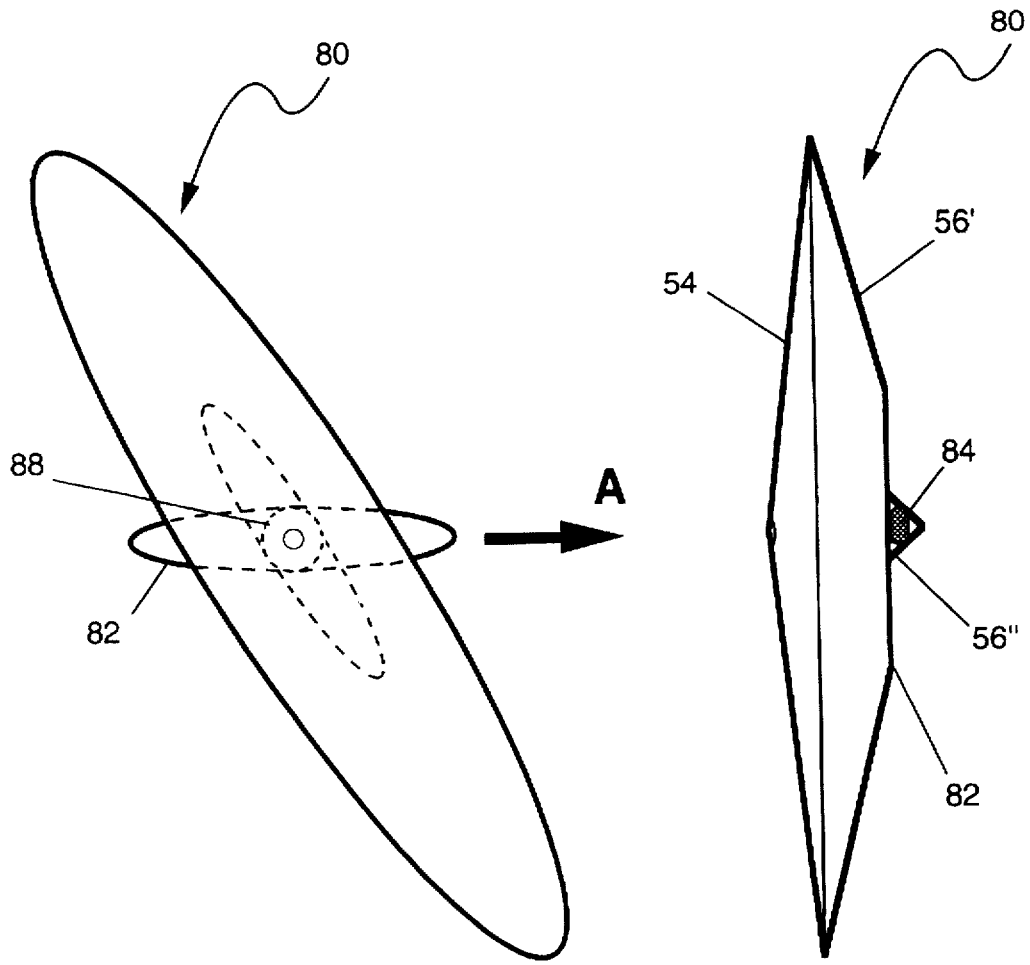
Fig. 6G
Fig. 6H
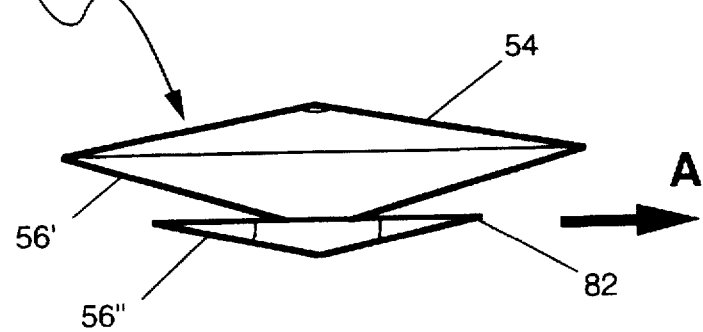
Fig. 6F

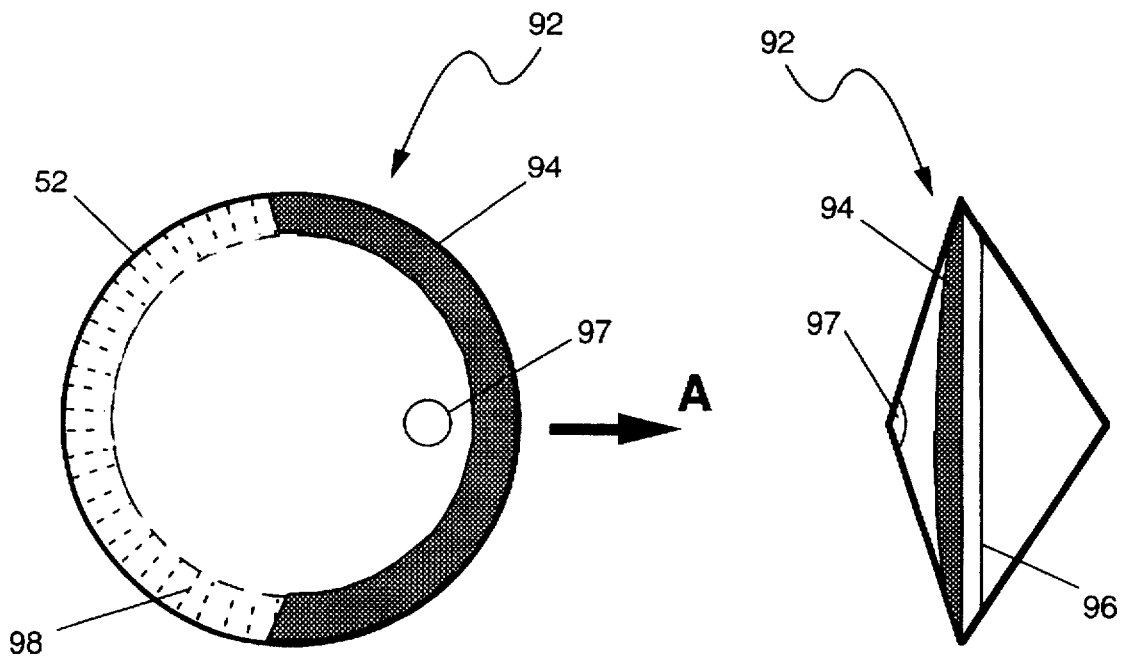
Fig. 7B
Fig. 7C
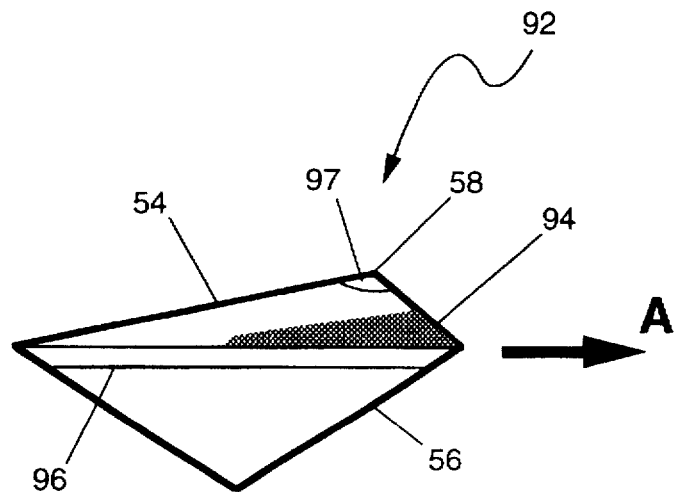
Fig. 7A

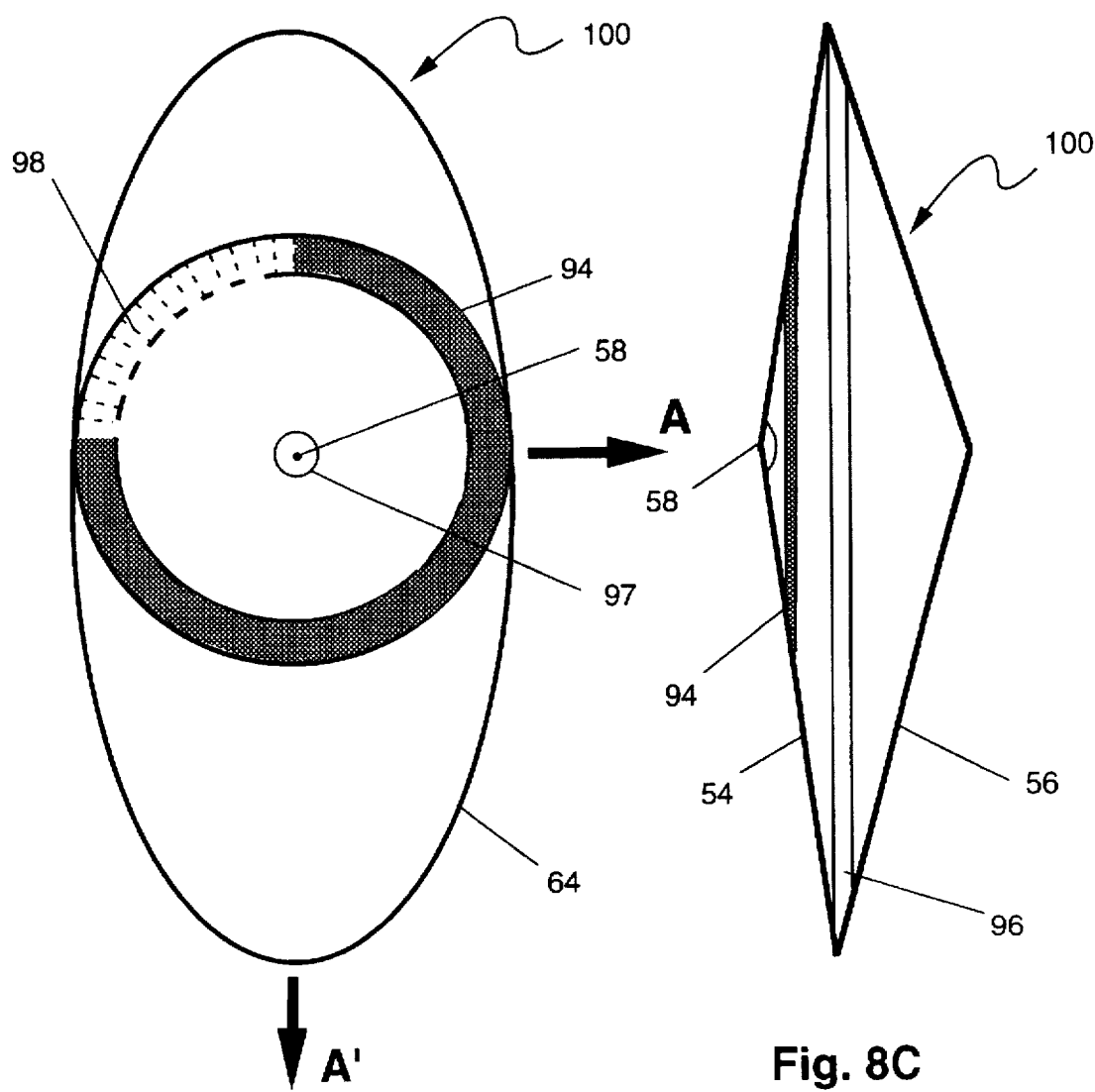
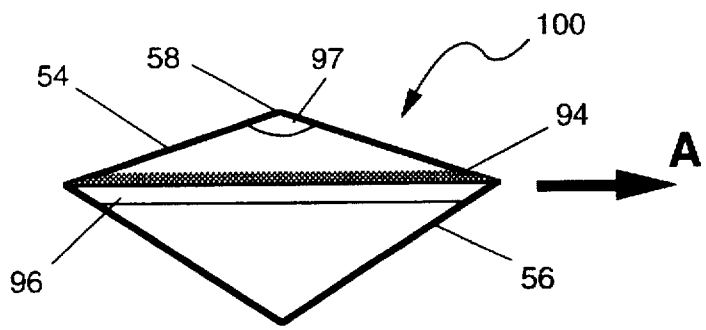
Fig. 8C
Fig. 8B
Fig. 8A

UNIVERSAL FLUID-DYNAMIC BODY FOR AIRCRAFT AND WATERCRAFT

BACKGROUND—FIELD OF INVENTION

This invention relates to air or water-borne vehicles or craft, specifically to a configuration of the vehicle's main body that provides not only passenger and cargo capacity, but also provides reduced fluid resistance.

BACKGROUND—DESCRIPTION OF PRIOR ART

Future supersonic military and commercial aircraft will be required to have high levels of lifting efficiency and minimal aerodynamic drag at subsonic, transonic, and supersonic speeds. Present philosophies for the design of aircraft vary greatly in addressing the desire to maximize performance at multiple operating conditions, but most employ some form of a traditional wing configuration. A review of existing wing design philosophies for subsonic, transonic, and supersonic flight reveals both contradictions, and similarities.

The contradictions exist mainly between the philosophies for subsonic flight and the schemes for supersonic cruise designs, where the subsonic flight includes takeoff, climb, descent, and landing operations, as well as the subsonic (low-speed) cruise design. For low-speed flight, takeoff, and landing designs, the tendency is toward a wing planform having a long span and narrow chord, where the chord is the width of the wing from the leading edge to the trailing edge and the planform is defined as the wing or vehicle outline when viewed from above. In addition wings designed for low-speed operation typically have little, if any wing sweep, such that the leading edge of the wing is generally perpendicular to the direction of flight. The traditional subsonic wing designs generally have blunt leading edges and relatively thick airfoils (cross-sectional shapes of the wings when viewed from the side). Such prior art airfoils induce a pressure distribution over the wing surface, needed to generate the required lift forces, by providing a convex upper surface having a height greater than the oppositely disposed lower surface depth. On the other hand, supersonic designs typically employ thin airfoils, sharp leading edges, and high sweep wings, such that the wing leading edge is at an acute angle to the direction of flight.

The total lift developed by a lifting airfoil, with other factors, such as angle of attack and dynamic pressures being equal, is substantially dependent on the aspect ratio of the airfoil, defined as the square of the span of the airfoil divided by the surface area. Therefore, it is apparent that a long narrow wing is capable of developing substantially greater lift-to-drag ratio than is attainable using a short broad wing of the same plan area. The use of the high-aspect ratio wing offers the advantages that the angle of attack required for landing and takeoff is at the low end of the spectrum. The takeoff and landing speeds are therefore lower than for the lower aspect ratio wings, thus permitting a relatively short takeoff and landing, as well as a low-speed climb to altitude. Furthermore, the drag due to lift is also at the low end of the spectrum, thereby providing high aerodynamic efficiency for subsonic cruise and low power requirements during takeoff and landing.

For transonic and supersonic flight however, highly swept wings are considered preferable because aerodynamic drag may be greatly reduced, and other advantages may also be obtained. For example, even during high altitude subsonic cruise, the highly swept wing configuration develops a comparatively low drag coefficient while still developing the requited lift coefficient. However, swept wing aircraft designed solely on the basis of supersonic high performance flight will obviously not perform satisfactorily for subsonic cruise, takeoff, and landing. Even present day supersonic aircraft are designed with aspect ratios higher than that considered optimum for supersonic cruising flight, to make takeoff and landing practical. These supersonic aircraft must also climb to cruise altitude at subsonic speeds to prevent shock wave ground effects and they must do this at the expense of increased fuel consumption since the relatively low aspect ratio of the wing results in increased drag due to lift while in climb.

Various attempts have been made to enable the wing configuration of an aircraft to be modified in flight to optimize both the low-speed and high-speed performance of the aircraft. At maneuvering conditions, designs for both low-speed and supersonic wings, utilizing variable-camber devices such as leading-edge and trailing-edge flaps, have succeeded fairly well. At supersonic speeds, however, leading edge flaps have accomplished only minimal benefits in performance. Devices designed to provide variable convexity to the wing contour or airfoil also have the added drawbacks of increased complexity in design, increased weight, and loss of usable volume. An alternative approach for meeting the required maneuvering conditions is developing a fixed-camber wing. Generally, these wing designs have succeeded at their designed lift conditions, but have suffered severe camber drag penalties at lower lift conditions. Techniques to mitigate some of these disadvantages by contouring three-dimensional upper and lower surfaces of the wing airfoil have been proposed-for example, in U.S. Pat. No. 5,112,120, dated May 12, 1992, to Wood et al. However, these techniques are limited to localized performance gains derived by modifying traditional airfoil technology with a significant adverse effect on manufacturing and production costs.

Further attempts have been made to enable the wing configuration of an aircraft to be modified in flight to optimize both the low-speed and high-speed performance of the aircraft. For example, turning the wing as a whole with respect to the fuselage of an aircraft, so that it can be set at a right angle to the fuselage for takeoff, landing, and low-speed flight and then pivoted as a unit so that it is skewed with one side swept forward and the other swept back at high-speeds has also been proposed in U.S. Pat. No. 3,971,535, dated Jul. 27, 1976 to Jones. Superior lift-to-drag ratios have been reported at all air speeds up to Mach 1.4 for aircraft having the skewed wing capability compared to the delta wing configuration aircraft. The straight wing operation also results in less noise and air pollution during takeoff compared to a delta wing configuration due to a takeoff power requirement reported to be only 25 percent of that needed for the delta wing design.

Although the skewed wing operation affords improved performance for aircraft required to fly at supersonic speeds, several disadvantages exist:

- a significant structural mechanism is needed to turn the wing,
- a separate fuselage section, with the corresponding contribution to aircraft weight and drag, is needed for passengers and cargo, and
- the benefits of the skewed wing performance appear to be limited to a skewed angle within the range of approximately zero to seventy degrees.

Techniques have been proposed to mitigate some of these disadvantages associated with the skewed wing aircraft. For example, in U.S. Pat. No. 4,836,470, dated Jun. 6, 1989 to Criswell, a rotatable flying wing is proposed although the wing configuration is undefined, except for the planform. Without an aerodynamically efficient wing configuration, severe performance penalties will offset any advantages of the rotatable flying wing concept. Also, American Institute of Aeronautics and Astronautics (AIAA) papers AIAA 92-4220 by Waters et at. and AIAA 92-4230 by Galloway et al. presented at the AIAA Aircraft Design Systems Meeting, 24–26 Aug. 1992, discuss structural and aerodynamic considerations for an oblique all-wing aircraft and oblique wing supersonic transport concepts. The basic performance of an oblique all-wing aircraft was reported to be excellent up to a design cruise speed of Mach 1.6. Although the oblique all-wing aircraft demonstrates improved performance compared to a typical swept-wing or delta-wing aircraft, there are significant disadvantages resulting from the present techniques employed to meld passenger and cargo space into a wing that has a traditional airfoil configuration. These conventional oblique all-wing aircraft disadvantages include:

The aerodynamic performance advantage is restricted to a maximum sweep or skewed angle of approximately 70 degrees. Some experts estimate that this sweep angle would correspond to a flight speed of Mach 2.0 as a practical upper limit.

The oblique all-wing aircraft would have to be very large, estimated to be large enough to hold 400 plus passengers, for practical operation as a passenger aircraft and to realize the performance advantage over the oblique wing aircraft that carries passengers and cargo in a conventional cylindrical fuselage.

With the wing positioned at an oblique angle on both takeoff and landing, depending upon the cockpit location, the pilot will likely experience unconventional visual cues and pilot visibility from the cockpit will be much reduced from the visibility that now exists for subsonic transport aircraft.

Structural design of the oblique all-wing aircraft will be more complex than conventional aircraft configurations and may depart significantly from traditional aircraft design practice, especially to:
 a. accommodate the flight and taxi bending moments with the unique weight distributions over the wing span,
 b. provide the pressurized cabin environment in a rectangular passenger section rather than the conventional cylindrical fuselage type aircraft, and
 c. incorporate aircraft flight control features and satisfy the aircraft trim constraints that are unique to the oblique all-wing configuration and operating attitudes.

The relatively high aspect ratio values needed to achieve the aerodynamic performance advantages of the oblique all-wing aircraft tend to exacerbate flight stability, trim, and control concerns associated with aeroelastic effects, such as the change in lift-force distribution as the wing is deflected by the aerodynamic forces.

Many subsonic aircraft configurations have been developed to satisfy unique functional needs, including aircraft capable of vertical takeoff and landing. Helicopters provide direct lift capability but relatively poor aerodynamic efficiency at cruise speeds which are also limited to the relatively low subsonic regime. Jet aircraft, using thrust vector control of the jet exhaust to achieve vertical takeoff and landing and the tilt-rotor V-22 Osprey aircraft are examples of aircraft designed to mitigate the disadvantages of the helicopter cruise performance. However, high-speed performance improvements are incorporated at the expense of the vertical takeoff and landing performance or the aircraft weight and complexity. Other attempts to improved cruise performance of a vertical takeoff and landing aircraft include aircraft having a circular planform with rotating outer rings. The rotating outer rings incorporate vanes or blades to provide lift and the rotating rings function as a gyroscope to provide vehicle stability. Examples of these circular planform aircraft are reported in Aerospace Daily article number 22404, dated 25 Jan. 1995 and described in U.S. Pat. No. 5,064,143, dated Apr. 19, 1989, to Bucher. Gyroscopic stability is a novel feature but, without a significant improvement in aerodynamic performance, the added weight and complexity of the aircraft is difficult to justify.

Traditional winged aircraft, used on aircraft carriers, often incorporate complex and heavy mechanisms for folding the wing sections to improve storage efficiency Satellites and spacecraft have relied chiefly upon multi-stage, expendable launch vehicles to achieve orbit or spaceflight. The NASA Space Transportation System (STS) Orbiter and space capsules are employed primarily where manned presence is needed in space flight and a return to earth is essential. The enormous cost of the expendable hardware, even the expendable hardware associated with the STS Orbiter, has prompted investigation of Single-Stage-To-Orbit (SSTO) launch vehicles. Materials and propulsion technology advancements are now being employed to develop SSTO design concepts. Although most SSTO vehicle configurations are based on a rocket engine thrust for launch in a vertical attitude and aerodynamic lift for landing, at least one concept relies upon rocket engine thrust for lift during both takeoff and landing. Using rocket engines to provide the lift during launch generally involves some staging to at least jettison most of the rocket engine propellant tankage that is emptied during launch. The SSTO vehicle that uses rocket engine thrust for lift during landing must carry the landing propellant through the launch, ascent, and de-orbit phases of the mission, thereby reducing the payload capacity of the vehicle. During takeoff and landing, the rocket engines cause not only high noise levels, but also create an adverse structural dynamic environment that the payload and any passengers must be capable of withstanding.

Submersible watercraft, such as submarines, are typically configured based on generally cylindrical bodies to minimize the frontal area with appendages added as needed to satisfy functional requirements such as the conning tower, propulsion systems, and diving controls. Typically the design for fluid-dynamic efficiency is incorporated after the size and shape of the submersible watercraft are established to satisfy internal capacity, configuration, and functional requirements. These performance efficiency features are often limited to generous rounding of corners and fairing of appendages to minimize the drag or fluid dynamic flow resistance as the vehicle moves through the water.

Hydrofoil watercraft are designed to float on the vehicle main body when at rest and during very low-speed operation. During transition to high-speed operation, the watercraft main body rises until the watercraft rides on the hydrofoils that are typically designed to hydroplane on the surface of the water. This surface effects operational feature tends to limit the hydroplaning to relatively smooth water surface conditions. In addition, unless the hydrofoils are retractable, adding to the weight and complexity of the watercraft, the extended hydrofoils and support struts significantly degrade watercraft performance during low-speed operation.

Objects and Advantages

Accordingly, several objects and advantages of the present invention are to improve the subsonic and supersonic aerodynamic performance of aircraft, reduce noise and air pollution, especially during the takeoff phase of high performance aircraft and spacecraft launch vehicles, and reduce the fluid-dynamic resistance of vehicles designed to operate in a water or liquid environment. Aerodynamic performance advantages include improved aircraft stability in the pitch and roll directions as well as greater lift to drag ratios throughout the operating regime. The invention provides a universal fluid-dynamic body which accommodates a wide variety of planforms, as needed to satisfy passenger or cargo functional, space or capacity, and operational requirements.

Further objects and advantages of this invention will become apparent from a consideration of the drawings and the ensuing description.

DRAWING FIGURES

FIG. 2A is a side view of a universal fluid-dynamic body showing sides of the conical upper and lower segments trimmed, thereby reducing frontal area.

FIG. 2B is a top view of the FIG. 2A body showing the circular planform of FIG. 1B trimmed to an elliptical planform and then modified to incorporate a smooth transition between the trimmed edges of the conical upper and lower segments.

FIG. 2C is a frontal elevation view of the body of FIGS. 2A and 2B showing the effects of trimming the side-walls.

FIG. 4A is a side view of a universal fluid-dynamic body in which a cylindrical section is inserted between the conical upper and lower segments and then modified to incorporate a smooth transition between the conical upper and lower segments.

FIG. 4B is a top view of the FIG. 4A body showing an elliptical planform configuration of the added cylindrical section before and after incorporating the smooth transition between the conical upper and lower segments.

FIG. 4C is a frontal elevation view of the body of FIGS. 4A and 4B.

FIG. 5A is a side view of a universal fluid-dynamic body in which the apex of the upper conical segment is positioned forward and the apex of the conical lower segment is positioned aft.

FIG. 5B is a top view of the FIG. 5A body showing an elliptical planform configuration selected to illustrate the fore and aft shift of the conical upper and lower segment apices.

FIG. 5C is a frontal elevation view of the body of FIGS. 5A and 5B.

FIG. 5D is a partial side view of the FIG. 5A body showing the effect of truncating the conical lower segment apex.

FIGS. 6A through 6C are side, top, and frontal elevation views, respectively, of a supersonic transport aircraft that embodies the universal fluid-dynamic body, in which the conical upper segment and upper section of the conical lower segment are rotated into the takeoff position.

FIGS. 6D and 6E are side and top views respectively of the FIGS. 6A through 6C supersonic aircraft, showing the option of extending the lower section and adding traditional elevator and rudder aerodynamic control systems.

FIGS. 6F through 6H are side, top, and frontal elevation views respectively of the FIGS. 6A through 6C aircraft, showing the conical upper segment and the upper section of the conical lower segment in transition between the takeoff position and fully rotated to the high-speed flight orientation.

FIGS. 7A through 7C are side, top, and frontal elevation views respectively of a subsonic aircraft that embodies the universal fluid-dynamic body, in which an outer ring compressor and thrust vector control system are incorporated to provide vertical takeoff and landing capability and gyroscopic stability.

FIGS. 8A through 8C are side, top, and frontal elevation views respectively of a supersonic version of the FIGS. 7A through 7C aircraft, in which a high aspect ratio planform is employed for low-speed flight and then the aircraft is rotated to the low aspect ratio planform for supersonic flight speeds.

Figure 1B:
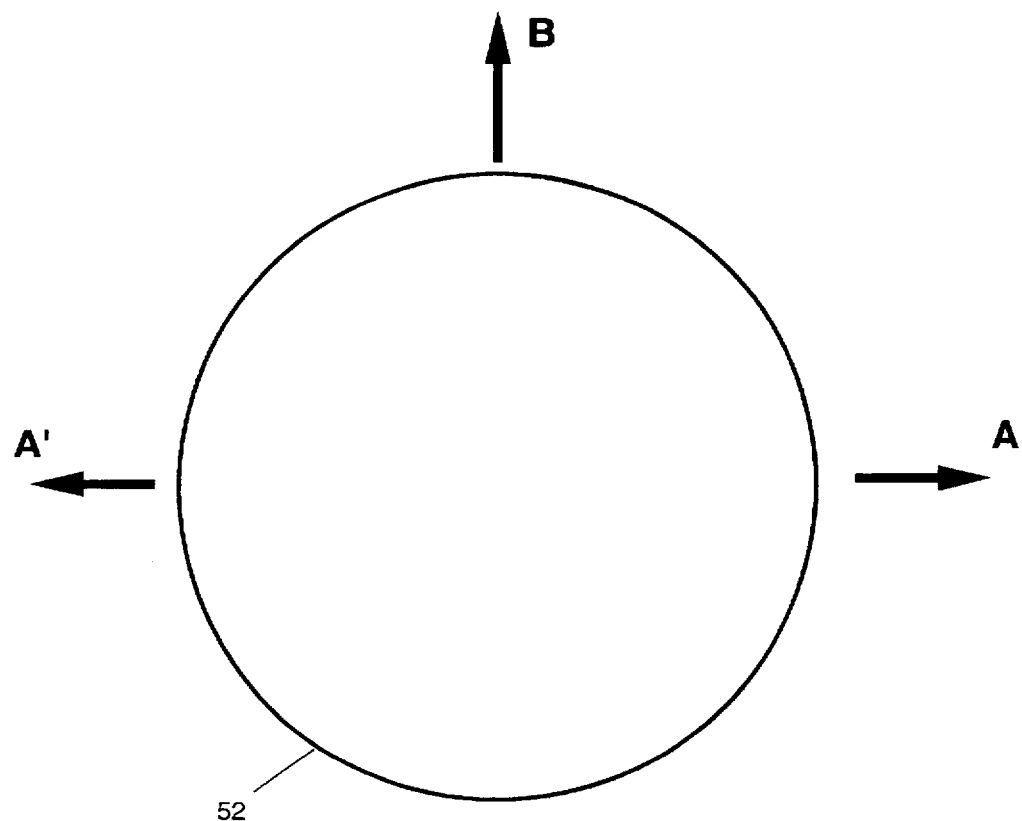
FIG. 1B is a top view of the FIG. 1A body showing a circular planform of a baseline configuration.

| Reference Numerals In Drawings | |
|---|---|
| 50 | universal fluid-dynamic body |
| 52 | circular planform |
| 53 | common baseplane |
| 53' | top of cylinder |
| 53" | bottom of cylinder |
| 54 | conical upper segment |
| 56 | conical lower segment |
| 56' | upper section of conical lower segment |
| 56" | lower section of conical lower segment |
| 58 | conical upper segment apex |
| 60 | conical lower segment apex |
| 62 | trimmed elliptical planform |
| 64 | new elliptical planform |

-continued

| | Reference Numerals In Drawings |
|---|---|
| 66 | second universal fluid-dynamic body |
| 68 | third universal fluid-dynamic body |
| 70 | alternate planform |
| 71 | fourth universal fluid-dynamic body |
| 72 | cylinder |
| 73 | rounded surface of truncated apex |
| 74 | rounded side-walls of cylinder |
| 80 | supersonic transport aircraft |
| 82 | truncating plane |
| 84 | air inlet |
| 86 | landing gear system |
| 88 | interface bearing |
| 89 | lower section extension |
| 90 | common vertical axis |
| 91 | traditional elevator system |
| 92 | vertical takeoff & landing aircraft |
| 93 | traditional rudder system |
| 94 | air inlet system |
| 95 | aerodynamic control surfaces |
| 96 | thrust vector control system |
| 97 | cockpit |
| 98 | compressor system |
| 100 | supersonic VTOL aircraft |
| 110 | hydroplane type watercraft |
| 112 | hydroplane watercraft propulsion system |
| 114 | tripod elements |
| 115 | support strut |
| 116 | submersible watercraft |
| 118 | conning tower |
| 120 | diving planes |

SUMMARY

According to the present invention I provide a unique body configuration that improves performance efficiency and stability of vehicles operating in a fluid environment. The basic body configuration can be visualized as two cones that have a common base plane and the intersection of the two cones at the common base plane defines the planform of the vehicle. In a preferred embodiment, the height of the conical upper segment, from the tip of the apex to the base plane is approximately two-thirds the height of the conical lower segment, also from the tip of the conical lower segment apex to the common base plane. Specifically, test results indicate an aircraft or watercraft that has this unique body configuration will exhibit relatively less drag or resistance to forward motion through the air or water, resulting in lower energy requirements and less noise, especially during aircraft takeoff and climb. Test results also demonstrated inherently stable flight of this unique body configuration.

Description of Universal Fluid-dynamic Bodies-FIGS. 1A through 5C

FIGS. 1A through 5C define the baseline configuration of a universal fluid-dynamic body according to the present invention and three alternate configurations defined by modifications of the baseline to provide unique functional or performance capabilities. Each of these four configurations is described in the following sections.

Figure 1A:
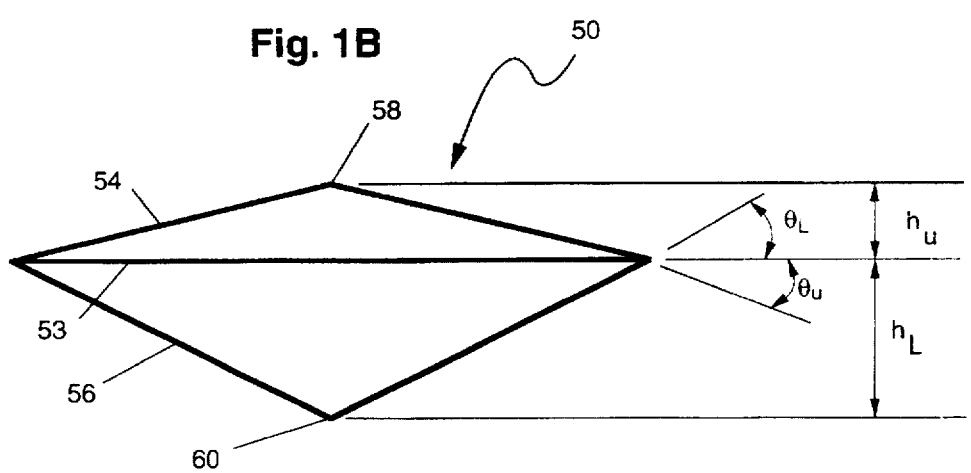
FIG. 1A is a side view of a universal fluid-dynamic body showing conical upper and lower segments, in accordance with the present invention

Baseline Universal Fluid-Dynamic Body-FIGS. 1A and 1B

The baseline configuration is illustrated by a universal fluid-dynamic body 50, shown in FIGS. 1A and 1B as having a circular planform 52. Body 50 comprises a generally conical upper segment 54 and an inverted generally conical lower segment 56. Conical upper and lower segments 54 and 56 interface and are joined at a common baseplane 53 defined by planform 52. Height $h_u$ of conical upper segment 54 is defined as the perpendicular distance from common baseplane 53 to a conical upper segment apex 58. Height $h_L$ of conical lower segment 56 is defined as the perpendicular distance from common baseplane 53 to a conical lower segment apex 60. Segment 54 has a height hu which is generally less than height $h_L$ of segment 56. In the preferred embodiment, segment 54 has a height hu which is within the range of one-half to five-sixth ($\frac{2}{3} \pm \frac{1}{6}$) of height $h_L$ of segment 56. Segment 54 has a downward slope from apex 58 to baseplane 53 forming an angle $\theta_u$ with baseplane 53. In the preferred embodiment, angle $\theta_u$ is within the range of 2 degrees to 10 degrees. Segment 56 has a upward slope from apex 60 to baseplane 53 forming an angle $\theta_L$ with baseplane 53. In the preferred embodiment, angle $\theta_L$ is within the range of 3 degrees to 18 degrees.

In the generic form shown in FIGS. 1A and 1B, body 50 is suitable for application as an aircraft or a watercraft. The front and rear views of body 50 are identical to the side view shown in FIG. 1A.

As can be seen by the symmetry of the body 50, vehicles or craft that embody this configuration are equally efficient moving in any lateral direction B, or reverse direction A', as well as forward direction A shown in FIG. 1B. However, functional design features, such as propulsion system and attitude control systems, not shown in either FIGS. 1A or 1B, will typically dictate a preferred forward direction of operation.

To accommodate the functional requirements of the desired application, a range of sizes, including height and planform area, may be selected for Body 50. These sizes may range from miniature solid-projectiles to jumbo size aircraft capable of carrying hundreds of passengers. Conventional production methods, preferably injection or poured molding processes to manufacture large quantities or lathe turning and milling techniques for larger sizes and smaller quantities, may be used to manufacture the solid-projectile versions of body 50. Fiberglass production techniques, currently used for surfboard production, are directly applicable to manufacture of body 50 for use as a surfboard. A conventional semi-monocoque structure design and construction techniques are suggested for larger versions of body 50 that require internal space to accommodate passengers and cargo. The semi-monocoque structure is comprised of a relatively thin outer shell with stiffeners attached as needed to aid in resisting internal pressure and external compression or collapse loads. Conventional structural design and production methods that are directly applicable to body 50 production include use of composite technology as well as aluminum skin construction, especially for the aircraft and spacecraft applications. Stringers or stiffeners, such as aluminum beam members (not shown), emanating from the region of apices 58 and 60 to a circumferential member (not shown) at the perimeter of planform 52, provide primary support structure for the shell or skin material forming the semi-monocoque structure. Circumferential support rings (not shown), radially spaced intermittently and joined to the stringers, provide additional strength and stiffness in conjunction with the external skin covering segments 54 and 56, to form an integrated basic structure.

Second Universal Fluid-Dynamic Body-FIGS. 2A through 2C

FIGS. 2A, 2B, and 2C, are side, top, and frontal views, respectively, of a second universal fluid-dynamic body 66 that provides a lower aspect ratio planform without affecting slope angles $\theta_u$ and $\theta^L$ of upper and lower segments 54 and 56, respectively. To produce Body 66, circular planform 52, shown in FIG. 2B, is trimmed to form an elliptical plan form 62. Elliptical planform 62 is then modified by fairing the trimmed edges of body 66, resulting in a new elliptical planform 64.

Figures 3B, 3C:
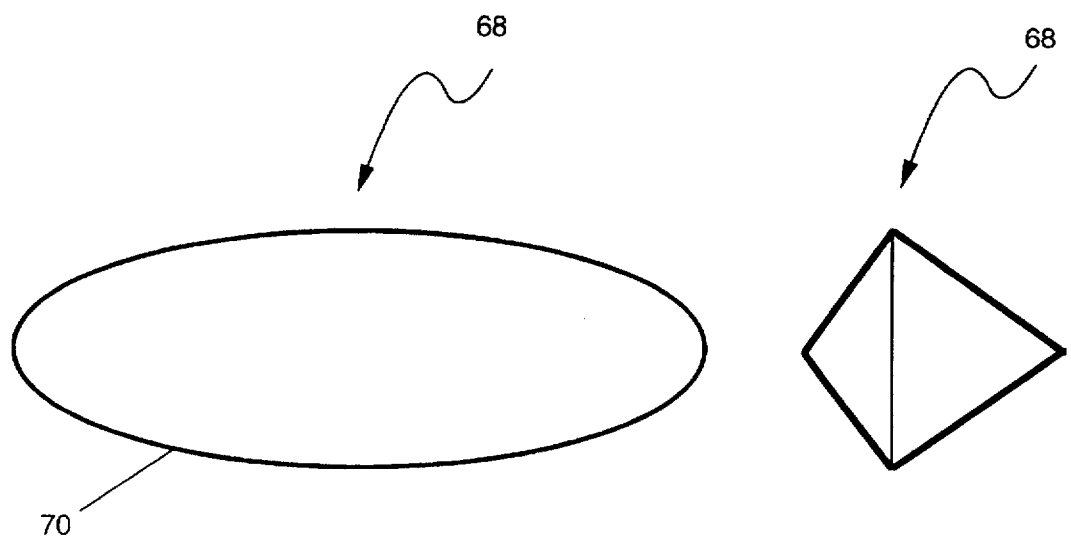
FIG. 3B is a top view of the FIG. 3A body showing the elliptical planform that defines the common baseplane of the conical upper and lower segments.
FIG. 3C is a frontal elevation view of the body of FIGS. 3A and 3B.
Figure 3A:
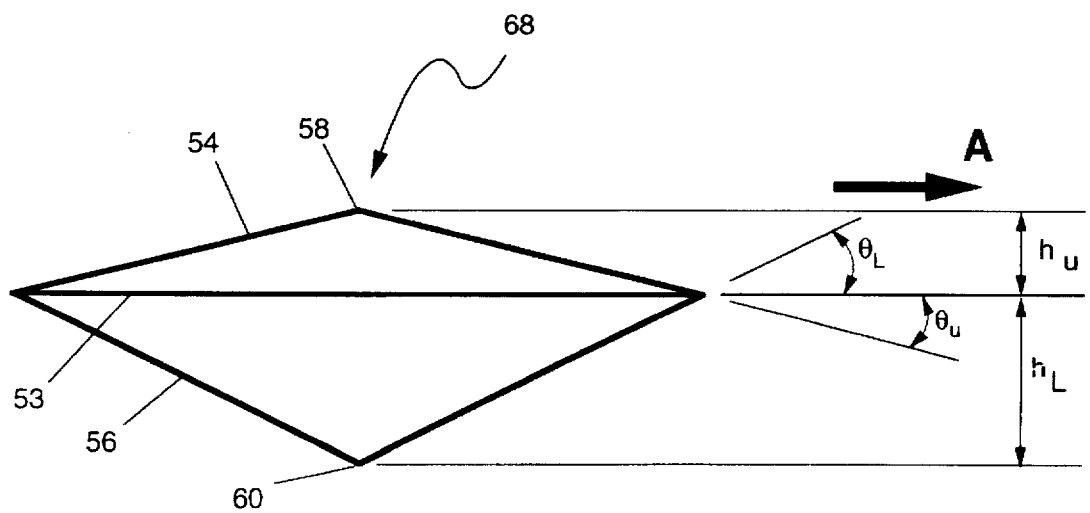
FIG. 3A is a side view of a universal fluid-dynamic body in which the conical upper and lower segments intersect a common baseplane that is elliptical in planform or outline as viewed from the top.

Third Universal Fluid-Dynamic Body-FIGS. 3A through 3C

A universal fluid-dynamic body may be provided for alternative planforms using techniques other than trimming a circular-planform body. For example, FIGS. 3A, 3B, and 3C are side, top, and end views respectively, of a third universal fluid-dynamic body 68. Body 68 comprises a conical upper segment 54 and an inverted conical lower segment 56 that intersect and are joined at common base plane 53 defined by an alternate planform 70. Height $h_u$ of conical upper segment 54 is defined as the perpendicular distance from common base plane 53 to conical upper segment apex 58. Height $h_L$ of conical lower segment 56 is defined as the perpendicular distance from common base plane 53 to conical lower segment apex 60. Height $h_u$ of segment 54 is generally less than height $h_L$ of segment 56. In the preferred embodiment, height $h_u$ of segment 54 is within the range of one-half to five-sixth ($\frac{2}{3} \pm \frac{1}{6}$) of height $h_L$ of segment 56. Due to the non-circular planform at the intersection of upper and lower segments 54 and 56, upper and lower slopes $\theta_u$ and $\theta_L$, respectively, vary around the perimeter of planform 70. However, in the preferred embodiment, angle $\theta_u$ is maintained within the range of 2 degrees to 10 degrees and angle $\theta_L$ is maintained within the range of 3 degrees to 18 degrees.

Fourth Universal Fluid-Dynamic Body-FIGS. 4A through 4C

Vehicles or craft that rely primarily on buoyancy rather than fluid-dynamic lift for vertical support typically are designed to provide more usable internal volume and less external wetted surface area. This may be accomplished without significantly sacrificing major performance advantages. For example, body 68, shown in FIGS. 3A, 3B, and 3C may be further modified to create a fourth universal fluid-dynamic body 71, shown in FIGS. 4A, 4B, and 4C. This is accomplished by inserting a cylinder 72 between conical upper segment 54 and inverted conical lower segment 56, thereby creating separate base planes 53' and 53" for segments 54 and 56, respectively, and serving as the upper and lower ends, respectively, of cylinder 72. The side walls of cylinder 72 are then hired with upper segment 54 and lower segment 56 to form a rounded side-wall 74 for improved fluid-dynamic performance and increased pressure vessel structural capability.

Conical upper and lower segment apices 58 and 60 are shown generally at the same station plane for all universal fluid-dynamic body configurations illustrated in FIGS. 1A, 2A, 3A, and 4A. However, for design or performance considerations such as, satisfaction of functional requirements or preferences, improvement of lateral stability, adjustment of the aerodynamic center of pressure to be more favorably aligned with the vehicle center of gravity, or enhancement of pressure loading as suggested in the Wood patent, supra, apices 58 and 60 may be positioned either forward or aft, either together or independently, as illustrated in FIGS. 5A, 5B, and 5C for third body 68. Likewise, either apex 58 or 60 may be truncated, as illustrated in FIG. 5D for segment 56, if desired to satisfy geometrical or functional preferences such as increasing ground clearance of an aircraft, without extending the height or length of the landing gear systems, not shown. A generally curved surface 73, shown in FIG. 5D, may be faired into the outer surface of truncated conical lower segment 56 to maintain smooth fluid-dynamic flow in the area of the truncated surface.

Vehicle Description and Operation-FIGS. 6A through 10C.

The following sections define implementation of universal fluid-dynamic body features into aircraft and watercraft as illustrated in FIGS. 6A through 10C. The corresponding description of operation for the preferred embodiment of the universal fluid-dynamic body is also included.

Supersonic Transport and Single-Stage-to-Orbit Aircraft-FIGS. 6A through 6L

New demands on supersonic aircraft for better economy and less noise necessitate a different concept in the design of such aircraft. A preferred embodiment of the universal fluid-dynamic body that addresses these economy and noise objectives is illustrated by a Supersonic Transport (SST) aircraft 80 in FIGS. 6A, 6B, and 6C, which are side, top or planform, and frontal views, respectively. A truncating plane 82 divides segment 56 into an upper section 56' and a lower section 56". Upper section 56' and lower section 56" are capable of being rotated relative to each other about a common vertical axis 90 that is normal to truncating plane 82. Structural continuity between upper section 56' and lower section 56" is provided by interface structural devices, such as an interface bearing ring 88, illustrated in FIG. 6B, with control system, not shown, for rotating upper section 56' relative to lower section 56". A vertical support device 86, such as a retractable landing gear system illustrated in FIGS. 6A and 6C, is provided for takeoff and landing. To minimize adverse effects on the aerodynamic performance of the aircraft, a traditional propulsion system, not shown, is preferably integrated within lower section 56". The location of a propulsion system, such as a jet engine, is indicated by an air inlet 84 shown in FIG. 6C.

A conventional attitude control system, not shown, such as thrust vector control or aerodynamic control surfaces 95, are integrated into or appended to segment 54 and sections 56' and 56". These provide pitch, yaw, and roll control during takeoff, flight, and landing of aircraft 80.

An extension 89 of the aft or downstream portion of section 56", such as illustrated in FIGS. 6D and 6E, is an alternative configuration, to support a traditional elevator system 91 and a traditional rudder system 93 for additional aerodynamic control, especially during takeoff, landing, and low-speed flight. Traditional hydraulic, pneumatic, propellant, electrical, and avionics systems, cargo and passenger accommodations, and cockpit features, not shown, are added as needed to satisfy the functional requirements of aircraft 80.

The takeoff, initial climb, and landing configuration of aircraft 80 is illustrated in FIGS. 6A, 6B, and 6C. The design takes advantage of the efficient low-speed performance, reduced noise, and improved lift capability in the high-aspect ratio configuration. During takeoff, aircraft 80 travels in direction A and accelerates until airspeed is sufficient to achieve the required aerodynamic lift. The pitch attitude of aircraft 80 is then adjusted to a predetermined angle of attack for takeoff.

Figure 6I:
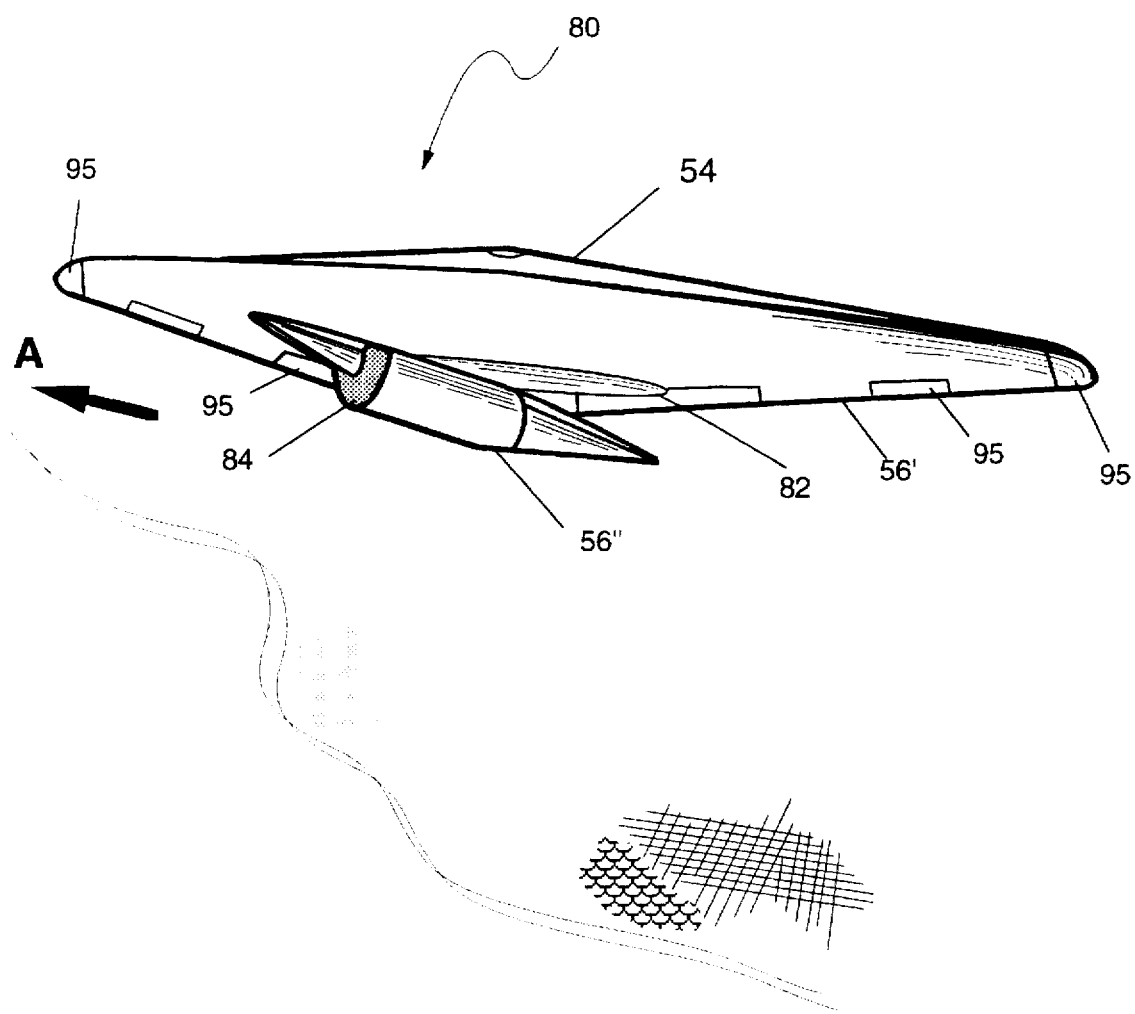
FIGS. 6I is an isometric view of the aircraft illustrated in FIGS. 6F through 6H.

Following takeoff, landing gear system 86 is retracted. During climb, segment 54 and section 56' are progressively rotated relative to section 56", as illustrated in FIGS. 6F, 6G, and 6H, to optimize aerodynamic performance efficiency as altitude and airspeed are increased. An isometric view of aircraft 80, with segment 54 and upper section 56' being rotated relative to lower section 56", is illustrated in FIG. 6I as aircraft 80 is in the climb phase of flight.

Figure 6L:
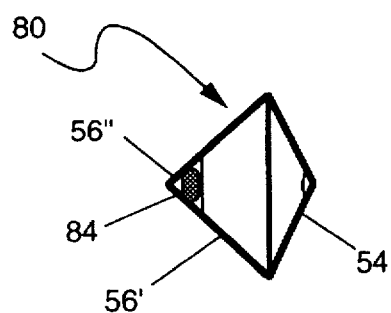
FIGS. 6J through 6L are side, top, and frontal elevation views respectively of the FIGS. 6A through 6C aircraft, showing the conical upper segment and the upper section of the conical lower segment fully rotated to the high-speed flight orientation.
Figure 6K:
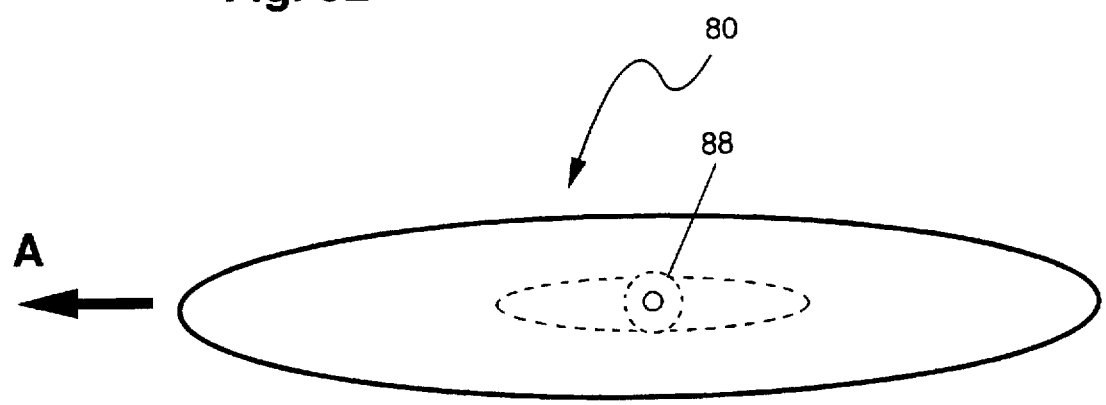
Figure 6J:
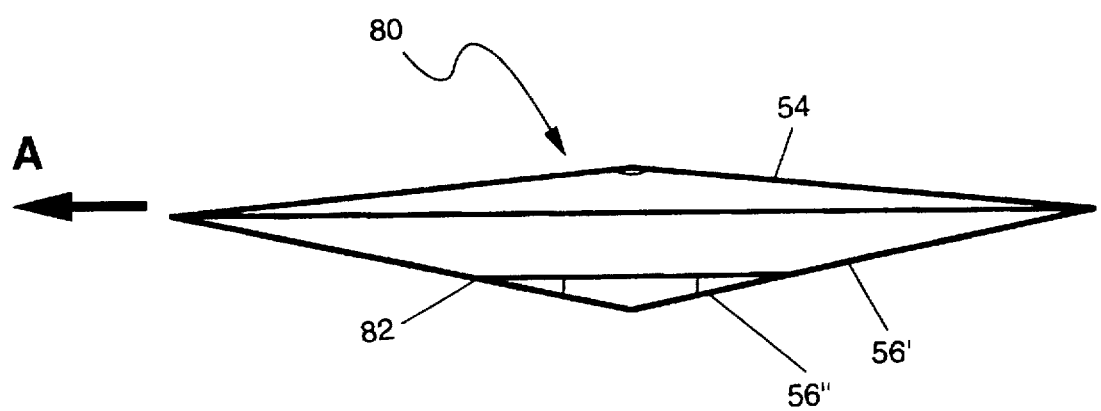

At high subsonic speeds, during transition from subsonic to supersonic (transonic) operation, and at supersonic and hypersonic flight speeds, segment 54 and upper section 56' of aircraft 80 are rotated generally in line with lower section 56", as illustrated in FIGS. 6J, 6K, and 6L, for peak performance efficiency and minimum sonic boom or shock effects. In a preferred embodiment that features added elevator 91 and rudder 93, a retraction mechanism, not shown, is employed to fold and retract elevator system 91 and rudder 93 into upper section 56' after upper section 56' and segment 54 are fully rotated and locked into the high-speed flight position. As altitude and airspeed increase, aircraft 80 operates as a Single Stage To Orbit (SSTO) or spacecraft vehicle. At altitudes above the tangible atmosphere, where the air-breathing engines are ineffective, a rocket propulsion system, not shown but preferably located within the structural envelope of aircraft 80, is used to provide the propulsive thrust.

During descent, segment 54 and upper section 56' are progressively rotated back toward the takeoff configuration as illustrated in FIGS. 6F, 6G, and 6H for descent, and then into the position shown in FIGS. 6A, 6B, and 6C for the landing orientation.

Vertical Take-off and Landing Aircraft-FIGS. 7A through 8C

A Vertical Takeoff and Landing (VTOL) aircraft 92 is a preferred embodiment of the universal fluid-dynamic body for subsonic and hover type applications. FIGS. 7A, 7B, and 7C are side, top or planform, and frontal views, respectively, of aircraft 92. Circular planform 52 is selected for an aircraft that is to be used predominately for low-speed and hover type operations. A cockpit 97 is situated in apex 58, which is located in a forward position to enhance pilot visibility and improve the ram air performance of an air inlet system 94, during forward flight. Vertical takeoff and landing are accomplished using a thrust vector control system 96 to direct exhaust flow from a single or multiple stage compressor system 98 to generate the necessary lift forces. Rotating rings of compressor system 98 also provide gyroscopic forces to augment stability control during vertical takeoff and landing. During forward flight, aerodynamic control surfaces, not shown, augment the pitch, yaw, and roll control forces of control system 96. Before takeoff and after landing, vertical support of VTOL aircraft 92 is provided by a traditional retractable landing gear system, not shown. In forward flight operation, the vertical support is derived predominately from the aerodynamic forces acting on segments 54 and 56, with the energy developed by the propulsion system, not shown, used almost exclusively for forward thrust, either directly or through compressor system 98 and control system 96.

The preferred embodiment of a supersonic VTOL aircraft 100, designed for transonic and supersonic flight speeds, employs generally elliptical planform 62 to take advantage of the large aspect ratio aerodynamic performance during low-speed flight and then rotate to the more efficient orientation, similar to SST aircraft 80, for high-speed, transonic, and supersonic flight operation. VTOL aircraft 100 is illustrated in FIGS. 8A, 8B, and 8C, which are side, top or planform, and frontal views, respectively, with flight direction arrow A indicating the low-speed direction of flight and arrow A' indicating the high-speed, transonic, and supersonic direction of flight. Operation of VTOL aircraft 100 is similar to that of VTOL aircraft 92, except upper segment apex 58 is positioned generally in the center of planform 62 to maintain apex 58 generally on the lateral centerline as aircraft 100 rotates or turns approximately 90 degrees from the low-speed to the high-speed position. Rotation or turning of VTOL aircraft 100 is similar to the technique described above for aircraft 80 and illustrated in FIGS. 6A through 6L.

Figure 9C:
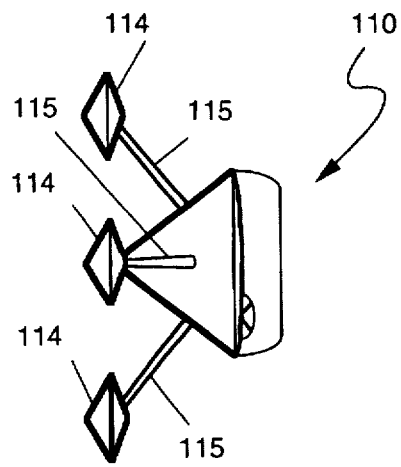
FIGS. 9A through 9C are side, top, and frontal elevation views respectively of a hydroplane watercraft, in which universal fluid-dynamic body configurations, having generally elliptical planforms, are employed as tripod lifting bodies and a conical lower segment is used for the watercraft main body.
Figure 9B:
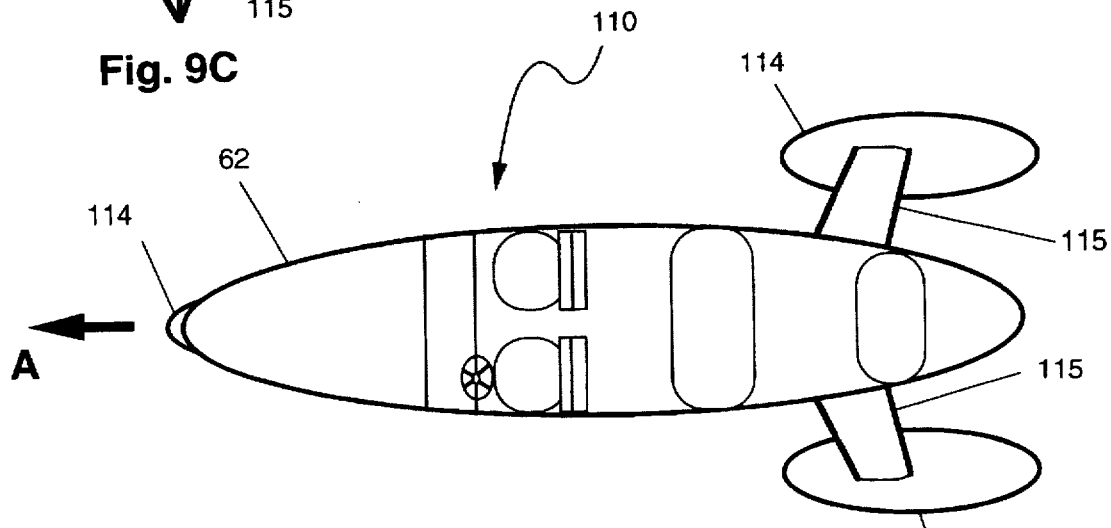
Figure 9A:
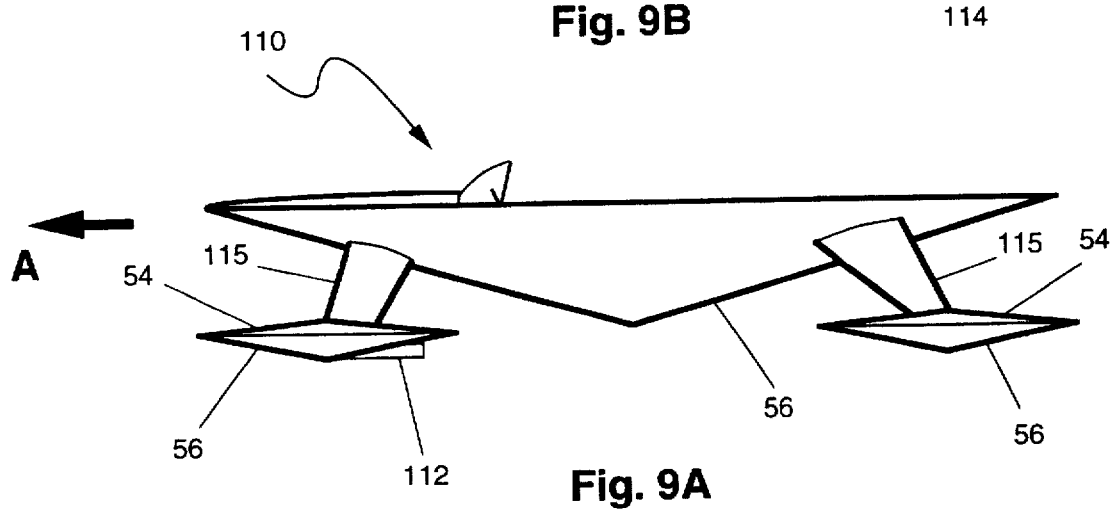

Hydroplane Watercraft-FIGS. 9A through 9C

The preferred embodiment of a hydro-plane type watercraft 110, designed for operation at high-speeds on the water surface, employs generally elliptical planform 62 for the main body of watercraft 110 to take advantage of the low aspect ratio fluid-dynamic performance in the direction of travel A. Watercraft 110 is illustrated in FIGS. 9A, 9B, and 9C which am side, top or planform, and frontal views, respectively. A tripod arrangement is employed to provide the hydroplane lifting forces. A tripod element 114 is joined to the lower end of a support strut 115. The upper end of each strut 115 is joined to segment 56 of watercraft 110. In a preferred embodiment, third universal fluid-dynamic body 68 configuration is used for tripod elements 114 to improve performance by reducing the frontal area. Tripod elements 114 lift watercraft 110 during transition to high-speed operation and then, at cruise speeds, ride on the water surface. A conventional propulsion device 112, such as propeller or water jet system, is used to provide the translational thrust and may include a steering system, not shown, such as thrust vector control or turning of one or more of tripod elements 114 to provide directional control of watercraft 110. The fluid-dynamic efficiency of tripod elements 114 provides improved performance for watercraft 110 during low-speed operation when tripod elements 114 are partially or completely submerged, including operation in rough water conditions. The use of conical lower segment 56 for watercraft 110 also provides lift during low-speed operation, gradually decreasing as watercraft 110 gains speed and rises to ride on the water surface.

Figure 10C:
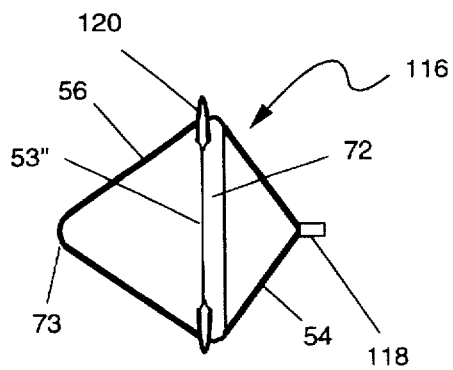
FIGS. 10A through 10C are side, top, and frontal elevation views respectively of a submersible watercraft in which a universal fluid-dynamic body configuration, having a generally elliptical planform and a cylindrical center section, are employed for improved fluid dynamic efficiency in a liquid environment.
Figure 10B:
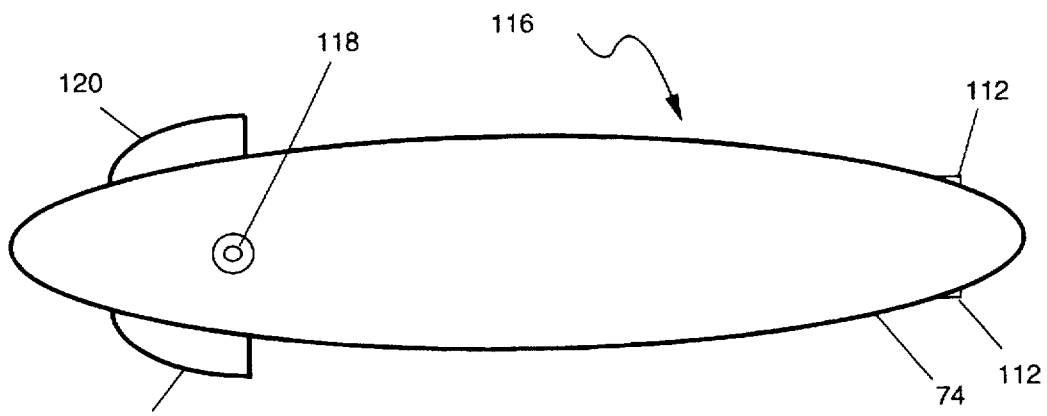
Figure 10A:
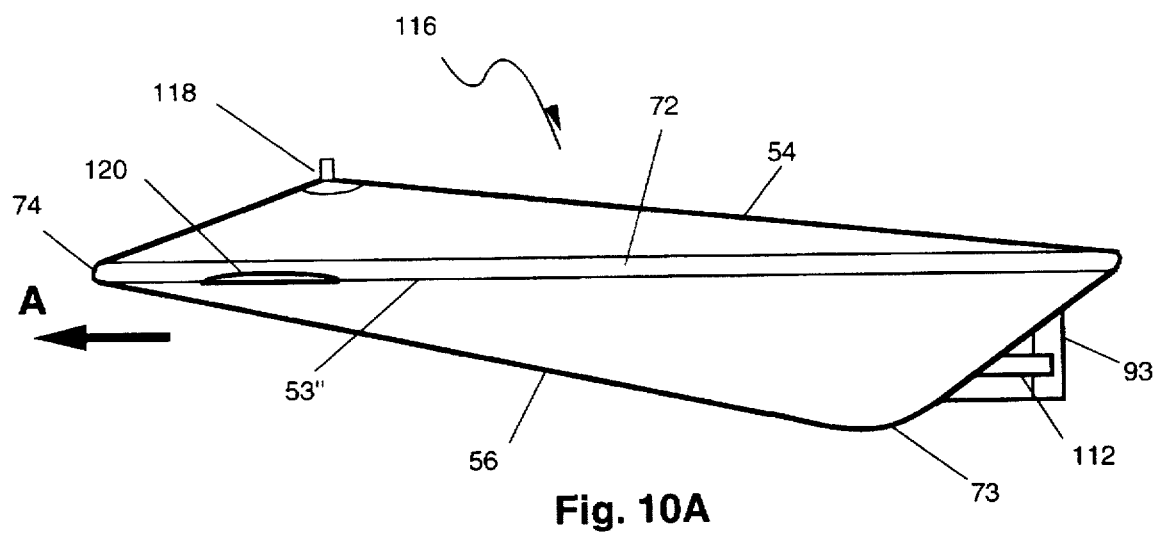

Submersible Watercraft-FIGS. 10A through 10C

The preferred embodiment of a submersible type watercraft 116, designed for operation primarily beneath the water surface, employs generally elliptical planform 74 for the main body to take advantage of the low aspect ratio fluid-dynamic performance in the direction of travel A. Watercraft 116 is illustrated in FIGS. 10A, 10B, and 10C which are side, top or planform, and frontal views, respectively. Watercraft 116 is comprised of a combination of universal fluid-dynamic body features shown in FIGS. 4A, 4B, 4C, 5A, 5B, and 5C. Cylindrical segment 72 is inserted between segments 54 and 56 to increase the usable internal volume and rounded side-walls of cylinder 74 provide a fluid-dynamically efficient transition surface between segments 54 and 56. Segment 54 is joined with segment 72 at top of cylinder 53' and segment 56 is joined with segment 72 at bottom of cylinder 53". Apex 58 of segment 54 is positioned forward to accommodate the predetermined location of a conning tower 118. Apex 60 of segment 56 is positioned aft of watercraft 116 center to improve directional control and accommodate predetermined requirements for increased cargo height in the aft end of watercraft 116. Rounded surface of truncated apex 73 is also incorporated to provide a broader, and therefore, more stable base for watercraft 116 when resting on the bottom of the liquid operating environment. A conventional propulsion device 112, such as a propeller or water jet system, is used to provide the translational thrust and may include steering system, not shown, such as thrust vector control to provide directional control of watercraft 116. A traditional attitude control system, such as a conventional rudder system 93 and a conventional diving plane system 120, are employed to provide depth and directional control of watercraft 116.

Theory of Operation

Traditional aircraft technology considers a flow field that is predominately two-dimensional over the airfoil at a given spanwise section of the lifting wing or body. This approach focuses the aerodynamic performance design efforts on airflow in the vertical direction above and below an airfoil section of the wing or lifting body and the airflow parallel to the direction of flight. However, little effort is directed toward improving performance by inducing a portion of the fluid flow in the lateral direction, around the lifting body. I believe the improved performance efficiency of the universal fluid-dynamic body is the result of the three-dimensional flow field effects, where a portion of the fluid is allowed to flow around the upper and lower conical segments of the aircraft and watercraft, as well as over and under the body, but do not wish to be bound by this.

Summary, Ramifications, and Scope

Accordingly the reader will see that various configurations can be used for numerous aircraft, spacecraft, and watercraft types to obtain the improved performance efficiencies and environmental friendly attributes associated with this universal fluid-dynamic body. Furthermore, the universal fluid-dynamic body has the following additional advantages, An all-wing aircraft that embodies the universal fluid-dynamic body is not constrained to an upper practical limit of 70 degrees oblique or sweep angle as indicated for oblique all-wing aircraft that are based on traditional airfoil design technology. The universal fluid-dynamic body is capable of rotating throughout a full 90 degree sweep angle range, from the high-aspect-ratio orientation for takeoff, with the aircraft planform ellipse major axis normal to the aircraft flight path, to the high-speed flight orientation in which the planform ellipse major axis is parallel to the flight path. This added sweep angle capability provides an estimated 25 percent performance advantage over delta-wing-type aircraft during takeoff. Also it provides additional performance gains during climb and cruise as the sweep angle is adjusted to optimize performance and satisfy the operating objectives, including reduced noise levels and avoiding the sonic boom problem over populated areas. The inherent configuration of the aircraft upper and lower conical segments will:

expand the operating envelope of an oblique all-wing aircraft, mitigate the potential adverse aeroelastic effects of the structure, enable the cockpit to be located in the apex area of either the upper or lower segment to eliminate the unconventional visual cues and pilot reduced visibility associated with previously proposed oblique all-wing aircraft, allow the aircraft mass or weight, including passengers, cargo, and expendables, to be concentrated more toward the center of the aircraft, thereby reducing the span of the landing gear and therefore, runway width requirements, and simplify the application of advanced composite structure technologies in conjunction with the performance efficiency advantages, increase the feasibility of developing a true Single-Stage-To-Orbit aircraft and launch vehicle with the attendant environmental advantages, provide savings in expendable hardware, and provide an overall performance improvement using air breathing propulsion for takeoff, landing, climb, and possibly cruise.

An SSTO aircraft that embodies the universal fluid-dynamic body and uses air-breathing propulsion rather than rocket engines for takeoff will provide reduced noise levels near the launch or takeoff area. Also it will allow less robust structural design of payloads and more pleasant experience for passengers due to the relatively benign acoustic, vibration, and acceleration environment.

The universal fluid-dynamic body, when employed as a hydrofoil for a hydroplane or motorboat, is more forgiving of rough water conditions than a traditional hydrofoil. There is also less tendency for the front end of a watercraft to rise excessively (pitch-up) as the motorboat speed increases. Although submersible watercraft rely primarily on buoyancy rather than fluid-dynamic lift for vertical support, performance efficiency is improved by incorporating the features of the universal fluid-dynamic body.

Although the baseline body configuration of the present invention is defined as a conical upper segment and a conical lower segment having a common base plane, modifications of this baseline configuration are feasible without significant adverse effect on performance. For example, passenger, cargo, or operational requirements may be accommodated by fore or aft positioning of either upper, or lower, or both apexes of the conical segments, the vehicle planform may be selected to satisfy a predetermined shape, the planform may be trimmed after establishing the upper and lower conical segments to produce sidewalls at predetermined positions on the vehicle perimeter, the apices of the conical segments may be truncated, a cylindrical segment, with sidewalls conforming to the established planform, may be added between the upper and lower conical segments to increase internal volume without affecting the planform and minimize the effect on buoyancy, and traditional functional systems, such as propulsion systems, including thrust vector control devices, retractable landing gear, attitude control systems, and vehicle electrical, avionics, hydraulic and pneumatic systems may be incorporated with minimal disruption of the fluid flow field around the vehicle.

Although preferred embodiments of the invention have been described by way of example, it is understood by those skilled in the field, that additional modifications within the scope of the invention may be made to the disclosed embodiments. Operation of the universal fluid-dynamic body in the inverted orientation or flying up-side-down, such that upper segment height $h_u$ is approximately ⅔ the height of lower segment height $h_L$, is also within the scope of the present invention. Although the description above contains many specificities, these should not be construed as limiting the scope of the invention but as merely providing illustrations of some of the presently preferred embodiments. For example, planforms used in the above illustrations are all generally elliptical but a variety of planforms that maintain the generally conical upper and lower body configurations can be provided. Traditional functional systems, such as;

propeller-, jet-, and rocket-engine-type propulsion devices, fluid-dynamic control surfaces and thrust vector control system for attitude and directional control, landing gear systems for aircraft and SSTO reusable spacecraft, etc., as well as state-of-the-art advances in propulsion, materials, avionics, etc., are applicable to the universal fluid-dynamic body for potentially even greater advantages. A wide variety of materials suitable for construction, including metals, woods, plastics, and composite materials such as fiberglass, carbon-fiber, and carbon-epoxy enable ease of construction using conventional fabrication techniques.

Thus the scope of the invention should be determined by the appended claims and their legal equivalents, rather than the examples given.

What is claimed is:

1. A universal fluid-dynamic aircraft or watercraft body, comprising:
   (a) a generally oblique-conical upper segment having a base and having an apex, and
   (b) a generally oblique-conical lower segment having a base and having an apex, said oblique-conical lower segment being inverted with respect to a common baseplane and joining said oblique-conical upper segment at said common baseplane, whereby said apex of said oblique-conical upper segment is positioned substantially above said common baseplane, and said apex of said oblique-conical lower segment is positioned substantially below said common baseplane, said apexes being offset from each other.

2. The universal fluid-dynamic body of claim 1 wherein the height of said oblique-conical upper segment is less than the height of said oblique-conical lower segment.

3. The universal fluid-dynamic body of claim 2 wherein the height of said oblique-conical upper segment is approximately two-thirds the height of said oblique-conical lower segment.

4. The universal fluid-dynamic body of claim 1 wherein a planform or outline of said body is coincident with the intersection of said oblique-conical upper segment and said oblique-conical lower segment at said common baseplane.

5. The universal fluid-dynamic body of claim 1 wherein a planform or outline of said body is circular at the longitudinal plane intersection and said oblique-conical upper segment and said oblique-conical lower segment both intersect said common baseplane at said circular planform.

6. The universal fluid-dynamic body of claim 1 wherein:
   a. said planform of said body is trimmed to narrow the width of said body by removing approximately equal portions from each side of said body, and
   b. said trimmed edges of said oblique-conical upper segment and of said oblique-conical lower segment are rounded to form a smooth fluid-dynamic surface joining said oblique-conical upper segment and said oblique-conical lower segment.

7. The universal fluid-dynamic body of claim 1 wherein a planform of said body is elliptical and said oblique-conical upper segment and said oblique-conical lower segment both intersect said common baseplane at said elliptical planform.

8. The universal fluid-dynamic body of claim 1 wherein:
   a. said apex of said oblique-conical upper segment is truncated, and said truncated apex edges of said oblique-conical upper segment are rounded to form a smooth fluid-dynamic surface, and
   b. said apex of said oblique-conical lower segment is truncated, and said truncated apex edges of said oblique-conical lower segment are rounded to form a smooth fluid-dynamic surface.

9. A universal fluid-dynamic aircraft or watercraft body, comprising:
   (a) a generally oblique-conical upper segment having a base and having an apex,
   (b) a generally cylindrical center segment having a lower end or base plane, a top or upper plane, and a plurality of side walls, and
   (c) a generally oblique-conical lower segment having a base and having an apex, said oblique-conical lower segment being inverted with respect to a common baseplane with said cylindrical center segment and joining said base of said oblique-conical lower segment with said lower end or base plane of said cylindrical center segment, said base of said oblique-conical upper segment joined with said top or upper plane of said cylindrical center segment, whereby said apex of said oblique-conical upper segment is positioned substantially above said top or upper plane of said cylindrical center segment and said apex of said oblique-conical lower segment is positioned substantially below said lower end or base plane of said cylindrical center segment, said apexes being offset from each other, and said side walls of said cylindrical center segment being rounded to form a smooth fluid-dynamic transition surface between said oblique-conical upper segment and said oblique-conical lower segment.

10. The universal fluid-dynamic body of claim 9 wherein the height of said oblique-conical upper segment is less than the height of said oblique-conical lower segment.

11. The universal fluid-dynamic body of claim 9 wherein the height of said oblique-conical upper segment is approximately two-thirds the height of said oblique-conical lower segment.

12. The universal fluid-dynamic body of claim 9 wherein a planform of said body is coincident with said smooth fluid-dynamic transition surface between said oblique-conical upper segment and said oblique-conical lower segment.

13. The universal fluid-dynamic body of claim 9 wherein a planform of said body is circular and said oblique-conical upper segment and said oblique-conical lower segment each intersect said cylindrical center segment generally at said circular planform.

14. The universal fluid-dynamic body of claim 13 wherein:
   a. said planform of said body is trimmed to narrow the width of said body by removing approximately equal portions from each side of said body, and
   b. said trimmed planform edges of said oblique-conical upper segment, of said cylindrical center segment, and of said oblique-conical lower segment are rounded to form a smooth fluid-dynamic surface joining said oblique-conical upper segment and said oblique-conical lower segment.

15. The universal fluid-dynamic body of claim 9 wherein a planform of said body is elliptical and said oblique-conical upper segment and said oblique-conical lower segment each intersect said cylindrical center segment generally at said elliptical planform.

16. The universal fluid-dynamic body of claim 9 wherein:

a. said apex of said oblique-conical upper segment is truncated, and said truncated apex edges of said oblique-conical upper segment are rounded to form a smooth fluid-dynamic surface, and b. said apex of said oblique-conical lower segment is truncated, and said truncated apex edges of said oblique-conical lower segment are rounded to form a smooth fluid-dynamic surface.

* * * * *

UNITED STATES PATENT AND TRADEMARK OFFICE
CERTIFICATE OF CORRECTION

PATENT NO. : 5,730,391
DATED : March 24, 1998
INVENTOR(S) : Miller, John A., Jr.
& Losey, William A.

It is certified that error appears in the above-identified patent and that said Letters Patent is hereby corrected as shown below:

On the title page: Item [56]

, second column, under "Other Publications", change the words "Sirfoil Sections for Arrwo" in the title of NACA TN 3183 to read "Airfoil Sections for Arrow".

Column 2, Line 1; Change the words "requited lift" to read "required lift".

Column 3, Lines 47, 48 & 49; Indent Item b to the same level as Items 'a' and 'c'.

Column 8, Lines 7 & 9; Change the "height hu" to read "height $h_u$" (2 places).

Column 9, Line 2; Change the angle "$\theta^L$" to read "$\theta$."

UNITED STATES PATENT AND TRADEMARK OFFICE
CERTIFICATE OF CORRECTION

PATENT NO. : 5,730,391
DATED : March 24, 1998
INVENTOR(S) : Miller, John A., Jr. & Losey, William A.

It is certified that error appears in the above-identified patent and that said Letters Patent is hereby corrected as shown below:

Column 9, Line 51; Change the words "then hired with" to read "then faired with".

Column 9, Line 67; Reposition the words "apices 58 and 60 may ..." to start on a new line rather than be a continuation of the fourth bullet item.

Column 12, Line 27; Change the words "which am" to read "which are".

Column 13, Line 64 through Column 14, Line 18; Indent the 5 sub-bullet items under the major bullet item "An all-wing ..." which starts at Column 13, Line 44.

Column 15, Line 59, Change the Claim 6 reference to "Claim 1" to read "Claim 5".

Signed and Sealed this

Twenty-third Day of June, 1998

Attest:

BRUCE LEHMAN

*Attesting Officer*       *Commissioner of Patents and Trademarks*